Figure 8:
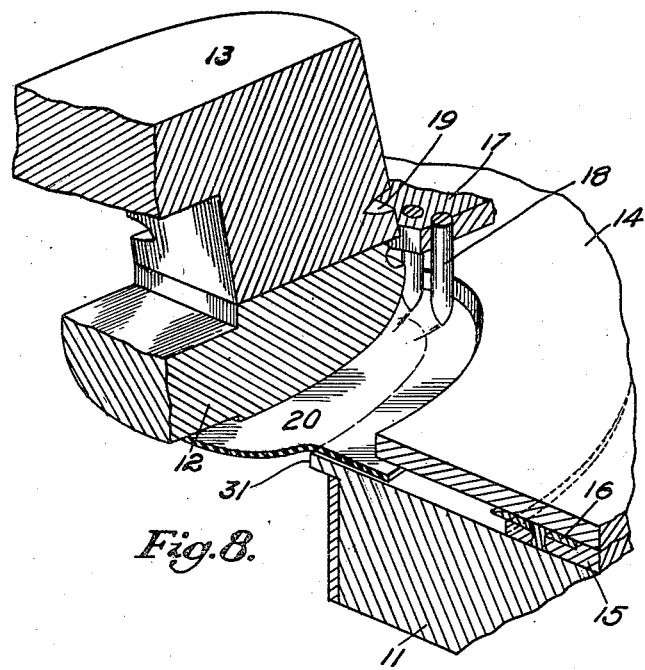

Dec. 10, 1946.　　　K. ENGEL　　　2,412,449
SHOEMAKING
Filed Oct. 2, 1943　　　3 Sheets-Sheet 1
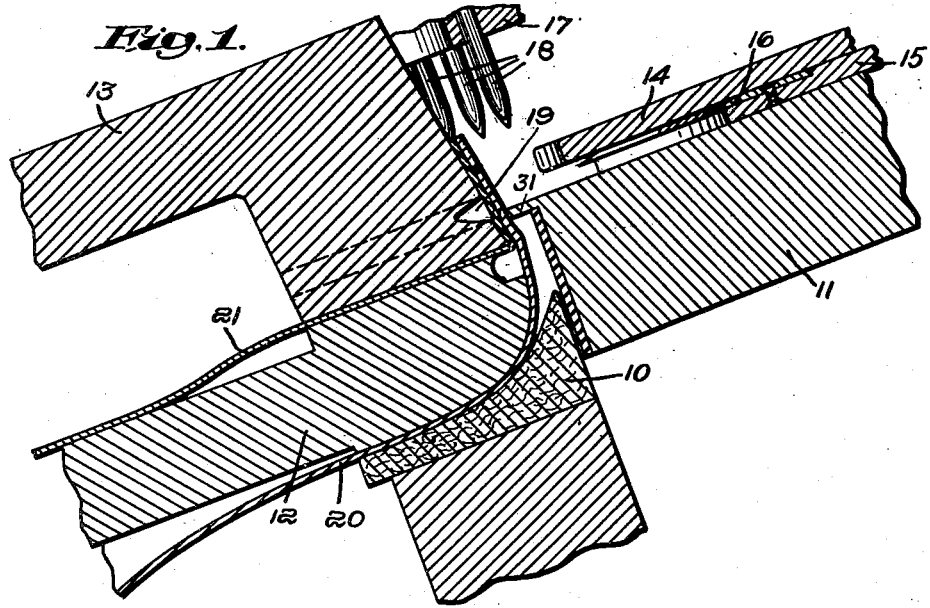
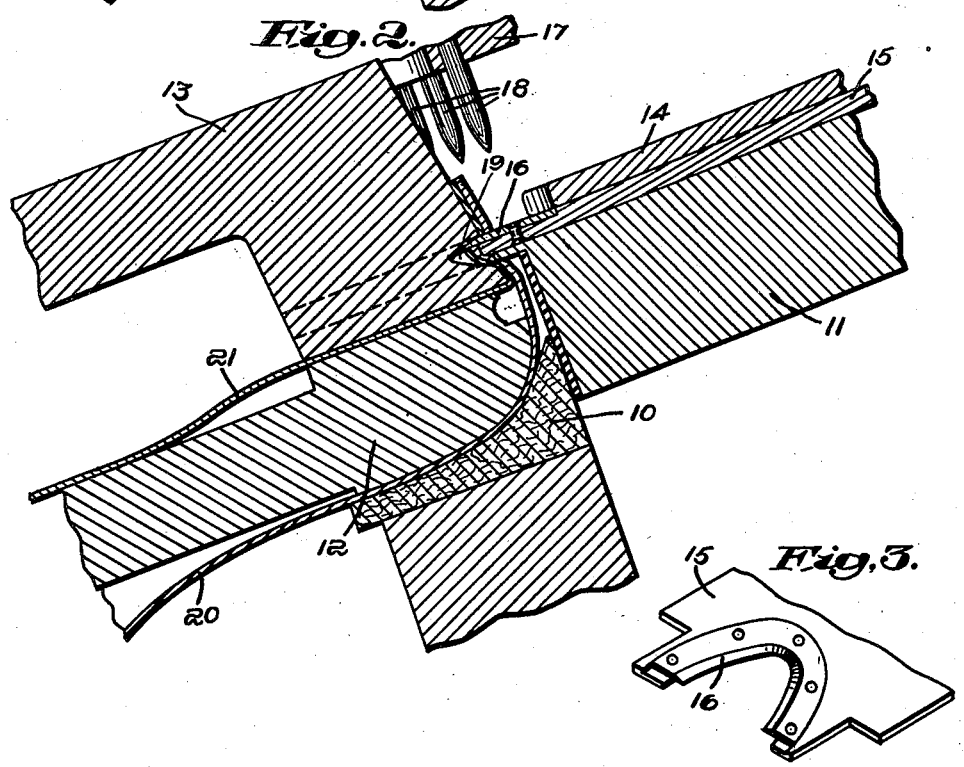
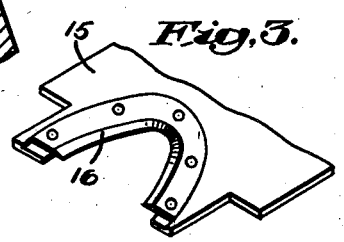
Inventor:
Karl Engel Dec. 10, 1946. K. ENGEL 2,412,449
SHOEMAKING
Filed Oct. 2, 1943 3 Sheets-Sheet 2
Fig. 4.
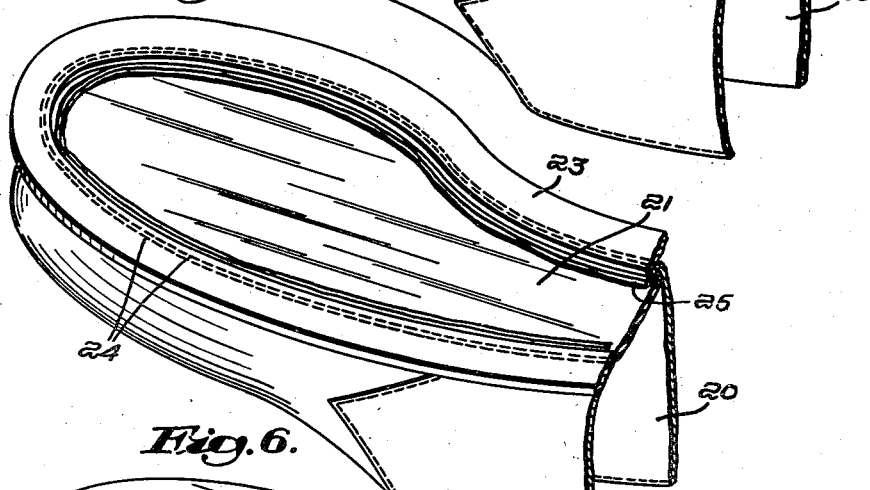
Fig. 5.
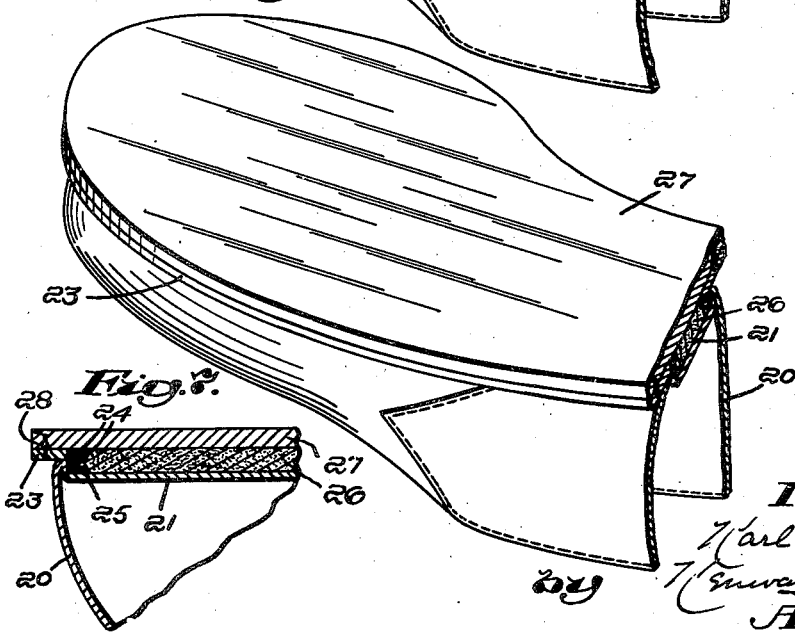
Fig. 6.
Fig. 7.
Inventor:
Karl Engel
by
Attorneys Patented Dec. 10, 1946

2,412,449

UNITED STATES PATENT OFFICE 2,412,449

SHOEMAKING

Karl Engel, Swampscott, Mass.

Application October 2, 1943, Serial No. 504,726

15 Claims. (Cl. 12—1)

This invention consists in an improved process of making pre-welt or Puritan-welt shoes characterized by molding the toe portion of the upper and the insole together and uniting them so that each supports the other in maintaining the molded shape which has been imparted to them. My invention also includes within its scope the improved pre-welt shoe herein shown as produced by the process of my invention.

In the manufacture of pre-welt shoes as heretofore practiced several difficulties have been encountered that have held back the wide use of pre-welt shoes which might have been otherwise expected.

In the first place, no matter how perfectly the upper has been molded, when it is removed from its molds the shape just imparted to it has been largely lost when the upper is being handled in subsequent operations. The molded upper tends to flatten out and, when it is eventually fastened, it has lost some of the fine lines which have been molded into it. An inaccuracy is thus introduced in the shoemaking process because of the variations in the shape of the uppers that take place before they are permanently fastened in their final shape.

In the second place, it has been difficult and has required the application of considerable shoemaking skill to locate the insole permanently in its proper place with respect to a molded upper. Further, insoles as heretofore used in pre-welt shoes have been found insecurely fastened in place and tend to break loose in wear and expose the bottom filler inside the shoe. This defect in a shoe is called a "floating insole."

In accordance with the present invention all these difficulties are entirely overcome and other important advantages secured. I propose to mold the toe portion of the upper in a concave die and while the molded upper is held by the die and before any disturbance can occur in its molded shape, I mold the toe portion of an insole into conformity with the molded walls of the upper and unite the molded insole thereto so that each tends to hold the other in molded shape and there is no possibility of losing the lines once they have been molded into the upper. This of course is partly because the insole acts as a connecting tie between the walls of the molded upper and positively prevents their flattening or spreading out. In molding the toe portion of the insole a pronounced angular flange is formed in its margin and this fits the inner contour of the upper with absolute accuracy since the molded walls of the upper constitute in effect a lining for the mold in which the insole itself is molded. The result is that the upstanding flange of the insole conforms accurately to every pleat and wrinkle in the molded margin of the upper and thus ideal surfaces are provided for uniting the two parts by cement.

In practice, the upper and insole may be molded as successive steps of a single operation, that is to say, the upper may be forced into a concave die and the insole may immediately follow the male die. In fact it may rest upon the surface of the male die and so be carried into the molded cavity of the upper. Preferably the surfaces of the upper and insole may be treated with cement prior to the molding operation so that the molded surfaces of both parts are united in the molding operation. This, of course, not only saves a great deal of time, but effects the cementing operation under ideal conditions from the standpoint of accuracy.

After the upper and insole have been molded and united in the single unit as above described the welt may be sewn to the composite upstanding marginal flange thus provided and this leads to further advantages from the shoemaking standpoint because the welt is sewn to the upper and insole after the latter have been given substantially the convex shape they are to retain in the finished shoe. The welt therefore fits much better and lies flatter than when the attempt has been made heretofore to sew it to the margin of a flat upper or to the margin of an upper which has been preliminarily molded but is not maintained in its final shape.

In addition to the advantages of the shoe produced by the process of my invention incident by reason of increased accuracy in every detail of its construction, an insole molded and cemented as above outlined presents a particularly smooth and attractive appearance inside the shoe. In fact the shoe appears to have a calf covered insole such as have been found heretofore only in the most expensive grades of men's shoes.

In completing the bottom of the shoe, the united margin of the upper and insole is inturned over the last bottom and in this operation the inner edge of the welt is drawn inwardly and a smooth fold is formed about the margin of the insole which corresponds to the feather of a regulation Goodyear welt insole, that is to say, it overlies the inturned margin of the upper and presents a smooth insole surface clear out to the inner upstanding wall of the upper. It presents this advantage however, over the regulation welt insole, to wit, that the folded margin has no tendency to come up in wear and stand at an angle to the plane of the insole as does the feather of a welt insole.

Figure 9:
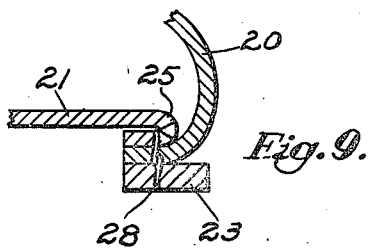

These and other features of my invention will be best understood and appreciated from the following description of a preferred manner of practicing it, together with the description of a shoe produced thereby, selected for purposes of illustration and shown in the accompanying drawings in which, Fig. 1 is a view of the molding dies in longitudinal section showing a vamp and insole as engaged by them, Fig. 2 is a similar view showing the vamp and insole in the positions they occupy at the conclusion of the molding operation, Fig. 3 is a view in perspective of a portion of the wiper, Fig. 4 is a view in perspective of the upper and insole molded together in the forepart of a shoe, Fig. 5 is a similar view showing the welt sewn in place, Fig. 6 is a similar view showing the molded and welted upper with the outsole in place, Fig. 7 is a view in cross section through the forepart of the finished shoe, Fig. 8 is a view in perspective showing the vamp in position preparatory to the molding operation, and Fig. 9 is a fragmentary sectional view of a portion of the shoe shown on an enlarged scale.

The forming and molding instrumentalities will be first briefly described. These comprise a lower mold 10 having a concave contour corresponding to the toe portion of the last and being firmly but yieldingly supported in position by means not herein shown. Surrounding the lower mold 10 is a stationary frame 11 having a forwardly opening U-shaped recess with an inwardly projecting flange 31 about its upper edge. Cooperating with this member is the movable male die which comprises two sections, viz, a lower section 12 with a lower face of convex contour shaped to fit the cavity of the lower mold 10 and a flat upper face, and an overlying section 13 with a flat lower face and adapted to engage and hold an insole against the upper flat face of the lower section 12 of the male mold. The overlying section 13 of the male die is provided with a peripheral channel 19 for the reception of the edge of the trimming knife to be referred to hereinafter.

The frame 11 carries a stationary gauge plate 14 and provides support for a wiper plate 15 which also has a U-shaped opening in its forward edge arranged to fit about the periphery of the die section 13. The wiper 15 slides under the gauge plate 14 and carries on its upper face a curved knife 16 for trimming the margin of the molded vamp and insole. A U-shaped hold-down member 17 provided with downwardly extending spurs 18 is arranged to cooperate with the stationary frame 11 in preliminarily positioning and holding the vamp or upper to be molded.

In employing the mechanism above described for carrying out the process of my invention a coating of cement is first applied to the margin of a vamp 20 on its inner or flesh face and the vamp is presented in flat position with its margin symmetrically overlapping the inner edge of the frame 11 and located by engaging the edge of the gauge plate 14. The hold-down 17 is then lowered bringing the spurs 18 into holding engagement with the cement-coated flesh side of the vamp. The lower section 12 of the male die is then forced downwardly carrying the vamp down within the recess of the frame 11 and simultaneously wiping its margin upwardly in cooperation with the projecting flange 31 of the frame. During this movement the material of the vamp is drawn smoothly under tension into the mold cavity, slipping beneath the points of the spurs 18 of the hold-down. When this movement has progressed to a point in which the upper face of the die section 12 is substantially flush with the upper face of the frame 11, depression of the die 12 is interrupted, the hold-down is lifted and an insole 21 is placed in position upon the upper face of the die section 12, with its margin, which has also been cemented, overlying the margin of the molded vamp 20. The upper section 13 of the die is then brought down upon the insole and the two die sections are further depressed together into the position shown in Fig. 1, that is to say, the vamp is pressed by the convexed surface of the lower die section 12 against the concave surface of the mold 10 and the margins of both the vamp and the insole are carried downwardly in contact into the U-shaped recess of the frame 11 to the position indicated in Fig. 1. The overlying margins of the insole and the vamp are thus flanged upwardly, brought into intimate engagement and firmly cemented together as a composite upstanding flange.

The vamp is now further tensioned over the die section 12 and smoothed into shape by moving the die sections 12 and 13 forwardly beneath the flange 31 into the position shown in Fig. 2. Thereupon, the wiper 15 is advanced, further shaping the upstanding flange which has now been molded into the united margin of the upper and insole. As the wiper is advanced the knife 15 acts to trim evenly the margin of the composite molded flange, passing into the channel 19 in doing so. In this operation, without any special care or attention on the part of the operator, the flange is given an accurate predetermined height or width. The molded vamp and insole forming the forepart of the shoe are then removed from the machine in the condition shown in Fig. 4. It will be noted that the flange of the insole is conformed exactly, pleat by pleat, to the upright wall or flange molded into the margin of the vamp and these two flanges or walls have been permanently united by cement in the curved shape of the toe of a last. The insole constitutes a webbed binder or tie extending from side to side of the molded vamp thus holding it positively in its molded shape and preventing spreading.

The next step of the process consists in sewing a welt to the margin of the upper including, of course, the molded composite flange which has been formed about its toe portion.

The forepart of an upper 20 molded with an insole 21 in the manner above explained is shown in Fig. 4 of the drawings. A welt 23 may be sewn to the upstanding composite marginal flange of the molded upper and insole by a seam 24 and if desired this may be conveniently done by a straight needle machine adapted to form a double seam as shown. It will be understood that at the point of sewing the insole, upper and welt are temporarily disposed in flat superposed position in the sewing machine. After the welt has been thus sewn it is flattened out and in so doing the margin of the insole 21 is turned inwardly making a fold 25, as best shown in Figs. 5 and 9, and giving the edge of the insole inside the upper a folded edge finish which is very attractive inside the shoe.

At this stage of manufacture the last may be inserted and the bottom of the shoe filled, preferably by plastic filler 26 as shown in Figs. 6 and 7. The filler levels the shoe bottom substantially flush with the plane of the welt 23 and places the shoe in condition for the reception of an outsole 27 which may be molded if desired, then laid and attached to the welt by the usual outseam 28 thus completing the shoe.

The machine herein disclosed for molding the margin of a vamp and the margin of an insole into conformity to each other and uniting their molded portions possesses many novel features and is claimed herein as an important aspect of my invention.

Having thus disclosed my invention and described in detail the preferred manner of carrying it out, I claim as new and desire to secure by Letters Patent:

1. The process of shoemaking which includes the steps of molding the toe portion of an upper to present an outwardly convex contour including an upstanding marginal flange, and, while holding the upper in molded position, molding an insole into conformity therewith, and attaching it to the upper.

2. The process of shoemaking which consists in molding the toe portion of an upper in a concave die to present an outwardly convex contour including an upstanding marginal flange, while the molded upper is held by the die, molding an insole into conformity therewith, and attaching the molded upper and insole together.

3. The process of shoemaking which includes the steps of molding the toe portion of an upper to present an outwardly convex contour including an upstanding marginal flange, and then molding the toe of a flexible insole against the inner surface of the molded upper while the upper is still supported in molded position, and fastening the molded upper and insole so that they tend to keep each other in molded shape.

4. The process of shoemaking which includes the steps of sinking the toe portion of an upper into a concave die thereby molding its margin into an upright curved wall, sinking the toe portion of a flexible insole into the same die inside the said upright wall of the upper, thereby molding its margin into an upright curved flange, and then uniting the upper and insole while preserving their molded contours.

5. The process of shoemaking which comprises molding the toe portion of a flat upper into the shape of the last and the margin of the upper into an upstanding flange, molding the toe portion of a flexible insole into conformity therewith, and fastening the molded insole to the molded upper to prevent flattening of the upper.

6. The process of shoemaking which includes the steps of molding the toe portion of a vamp into convex contour and the margin of the vamp into an upstanding flange, and while holding the vamp in molded shape, fastening a binding tie of sheet material between its molded marginal flange to preserve its convex shape.

7. The process of shoemaking which includes the steps of molding the toe portion of a vamp into convex contour with upstanding side walls, and while holding the vamp in molded shape, flanging an insole and fastening it in place between the molded upstanding walls of the vamp.

8. The process of shoemaking which includes the steps of molding the toe portion of a vamp into convex contour, molding a flexible insole into conformity to the margins of the molded vamp and uniting the two in a composite margin, and then folding said margin inwardly so that the insole presents a folded edge adjacent to the inner surface of the vamp inside the shoe.

9. A machine for molding and uniting a vamp and insole, comprising a concave toe mold, a correspondingly shaped toe die having a convex molding face and a flat top, a device for holding an insole in position upon the flat top of the toe die with the margin of the insole projecting beyond the contour of the flat top thereof, and a mold member with a U-shaped recess cooperating with said toe members in shaping both a vamp and the margin of an insole into conformity with each other.

10. The process of shoemaking which includes the steps of molding the toe portions of an upper and a flexible insole as successive steps of a single operation into a single composite upstanding flange, and uniting the molded toe of the insole to the inside surface of the molded toe of the upper.

11. The process of shoemaking which includes the steps of forcing an upper downwardly into a concave die, immediately forcing the toe portion of a flexible insole into the die-supported upper, thereby forming an upstanding flange in the insole fitting within the upper, and fastening the said flange to the molded upper.

12. The process of shoemaking which includes the steps of molding the cemented toe portion of an upper and the margin of a flexible insole as successive steps of a single operation into a single composite upstanding flange.

13. The process of shoemaking which includes the steps of molding the toe portion of an upper to present an upstanding flange to which a welt strip may be sewn, molding the marginal portion of a flexible insole into an upstanding flange fitting within the flange of the upper, uniting the two flanges into a unitary composite flange, and trimming the flange to predetermined height.

14. The process of preparing the upper of a prewelt shoe for the attachment of a welt strip, which includes the steps of molding the cemented margin of an upper and a flexible insole into a laminar composite flange standing at an angle to the body of the insole and tied between its sides by the interposed body of the insole, and then trimming the flange to a predetermined uniform height throughout its length.

15. A machine for molding, uniting and trimming a vamp and insole, comprising a concave toe mold, a correspondingly shaped toe die having a convex molding face terminated by a flat sole-supporting face, means for holding a flexible insole upon said flat face with the margin of the insole projecting beyond the contour of the toe die, a mold member having a U-shaped recess cooperating with said toe die and said holding means in shaping the upper and insole into a composite upstanding marginal flange, and a trimming knife movable to trim the flange to a predetermined height.

KARL ENGEL.